United States Patent
Patruno et al.

(10) Patent No.: US 6,882,511 B1
(45) Date of Patent: Apr. 19, 2005

(54) ELECTRONIC EARTH LEAKAGE CURRENT DEVICE

(75) Inventors: Walter Patruno, Buccinasco (IT); Salvatore Brandonisio, Milan (IT); Paolo Antonello, Arluno (IT); John Samuel Beniston, Sandhausen (DE); Willy Schwarz, Unterstammheim (CH)

(73) Assignee: ABB Service S.r.l., Milan (IT)

( * ) Notice: Subject to any disclaimer, the term of this patent is extended or adjusted under 35 U.S.C. 154(b) by 0 days.

(21) Appl. No.: 10/169,405

(22) PCT Filed: Nov. 28, 2000

(86) PCT No.: PCT/EP00/12074
§ 371 (c)(1),
(2), (4) Date: Sep. 30, 2002

(87) PCT Pub. No.: WO01/50567
PCT Pub. Date: Jul. 12, 2001

(30) Foreign Application Priority Data

Dec. 30, 1999 (IT) ........................... MI99A2755

(51) Int. Cl.$^7$ .............................. H02H 3/00; H02H 9/08
(52) U.S. Cl. ........................................ 361/42; 361/96
(58) Field of Search ........................ 361/42, 96, 89; 340/507, 508

(56) References Cited

U.S. PATENT DOCUMENTS

| 4,185,277 A | * | 1/1980 | Corso ........................... 340/508 |
| 4,206,398 A | * | 6/1980 | Janning ........................ 324/51 |
| 4,393,431 A | | 7/1983 | Gilker |
| 4,647,920 A | * | 3/1987 | Corso ........................... 340/650 |
| 4,841,405 A | * | 6/1989 | Udren ........................... 361/80 |
| 4,947,278 A | * | 8/1990 | Nichols, III .................. 361/46 |
| 5,875,087 A | * | 2/1999 | Spencer et al. ............... 361/87 |
| 5,995,911 A | * | 11/1999 | Hart ............................. 702/64 |

FOREIGN PATENT DOCUMENTS

| DE | 3807935 A1 | | 5/1989 |
| GB | 072 441 A | * | 9/1981 |

* cited by examiner

Primary Examiner—Brian Sircus
Assistant Examiner—Zeev Kitov
(74) Attorney, Agent, or Firm—Connolly Bove Lode & Hutz LLP; Myron K. Wyche

(57) ABSTRACT

An electronic leakage current device a low-voltage power line, comprising:
- a moving contact and a fixed contact which can be mutually coupled/uncoupled;
- first sensor means for detecting a earth leakage current and for generating an electric signal which is indicative of the value of the earth leakage current;
- first electronic means which are electrically connected to the first sensor means in order to generate an electric tripping signal depending on the electric signal which is indicative of the value of the earth leakage current, said first electronic means generating the electric tripping signal after a preset minimum time interval; and
- actuation means, operatively connected to the moving contact, in order to perform, in response to the electric tripping signal: the separation of the moving contact from the fixed contact.

18 Claims, 3 Drawing Sheets

ELECTRONIC EARTH LEAKAGE CURRENT DEVICE

The present invention relates to an electronic earth leakage current device for a low-voltage power line having improved functionality.

In particular, the present invention relates to an electronic earth current leakage device for single- or three-phase low-voltage power lines (therefore for voltage values below 1 KV), provided with electronic and circuit means, which allow to improve the tripping criteria of the electronic leakage current device. Many examples of electronic leakage current devices, for protection of a low-voltage power line, are known. The main function of said electronic leakage current devices is to interrupt the power line, if an earth leakage current, above a certain preset threshold, is detected. The power line on which tripping occurs can be the power supply line (single- or three-phase) related to a specific load or to a local electric user, for example of the industrial or domestic type.

The expression "electronic earth leakage current" is to be understood as describing, for example, a fault current towards earth, generated by any malfunction of the power line or of the electric loads to which the power line is connected.

For this reason, known electronic leakage current devices generally comprise the following functional elements:
- a current sensor for detecting an electronic earth leakage current (also known as imbalance current or residual fault current) in a phase conductor of the low-voltage power line;
- an electronic circuit for processing a signal which is indicative of the value of the earth leakage current and is sent by the current sensor;
- an actuator for determining, by opening electric contacts, the interruption of the power line following a tripping signal that arrives from the above described electronic circuit.

Tripping events, which cause the interruption of the power line by the electronic leakage current device, occur according to universally acknowledged technical standards, which set the technical requirements to be met in order to consider the electronic leakage current device safe for the user of the power line. In common practice, a tripping characteristic is determined for each device. This tripping characteristic depends on the constructive characteristics of the device and ultimately on the characteristics of the electronic circuit of the device. FIG. 1 plots the tripping characteristics prescribed by technical standards for an electronic leakage current device commonly defined as of the "general" type (line 11) and for an electronic leakage current device commonly defined as of the "selective" type (lines 12a and 12b). The abscissas plot the detected earth leakage current (I$\Delta$) and the ordinates plot the time interval (t) for performing the tripping. As shown in FIG. 1, at least for current values which are close to the nominal current (IAN), there is a substantial relation of inverse proportionality between the detected earth leakage current and the time interval allowed for tripping.

The maximum time interval ($t_M$) for tripping substantially depends on the trend of the tripping characteristic of the electronic leakage current device. Since an inverse proportionality relation exists, this interval can be determined, for each value of the detected earth leakage current, on the basis of the slope of the tripping characteristic at the nominal current value IAN (point A of FIG. 1).

An electronic leakage current device of the general type, made according to technical standards, has a tripping characteristic, which lays in the region 13 of FIG. 1 (dashed line 16 of FIG. 1). Likewise, an electronic leakage current device of the selective type has a tripping characteristic, which lays in the region 14 of FIG. 1 (dashed line 17 of FIG. 1, arranged between the lines 12a and 12b). Clearly, no electronic leakage current device can have a tripping characteristic, which lays in the region 15 of FIG. 2. Another parameter that characterizes each electronic leakage current device is the minimum tripping current, I$\Delta_0$, the value of which depends essentially on the nominal current (I$\Delta_N$) of the electronic leakage current device. In common practice, the relation $(0.5\ I\Delta_N)=(I\Delta_0)<(I\Delta_N)$ holds. The minimum tripping current represents the minimum leakage current that must theoretically be detected in order to trip the electronic leakage current device. In the chart of FIG. 1, said minimum leakage current is represented, for example in the case of the device having the dashed line 16 as its characteristic, by the vertical asymptote 18.

Known electronic leakage current devices generally comprise electronic circuits for setting the minimum current and/or the maximum time interval for tripping. These circuits are generally constituted by electronic networks of the RC type, which process the electric signal, indicative of the value of the detected earth leakage current, that arrives from the current sensor. For example, the maximum time interval is commonly set by means of introducing a time delay proportional to the detected leakage current value.

Known electronic leakage current devices have drawbacks.

First of all, although the technical solutions that are commonly adopted allow to preset some important parameters that characterize the tripping criteria of the electronic leakage current device, they do not allow to define in advance the overall behavior of the device and ultimately the trend of the tripping characteristic. This fact entails a high degree of uncertainty in the behavior of the device for earth leakage current values, for which the proportional delay, introduced by commonly adopted technical solutions, tends to drop to negligible values. In this case one has limited control over the tripping times of the electronic leakage current device. This fact can entail, for example, unexpected interruptions (known as "untimely trips") of the power line which are very unpleasant for the user. Furthermore, considerable problems can occur if an electric network includes electronic leakage current devices in a cascade configuration (for example a device of a general type connected to a network with devices of the selective type). In this case, the uncertainty regarding the tripping time entails problems in providing coordinated management of the tripping events of the electronic leakage current devices.

Furthermore, since in known electronic leakage current devices, the tripping characteristic of each device is not easily adjustable in advance during design, many electronic leakage current devices can turn out to be non-compliant with the standards during testing and inspection. This fact entails, in addition to a high degree of uncertainty as to the compliance of the electronic leakage current device to the applicable standards, many difficulties, if it is necessary to meet particular requirements of the electrical user, for which the device is intended. For example, it is difficult to determine beforehand whether a device must be of the general type or of the selective type or whether a device must have a more complex tripping characteristic. Accordingly, complex calibration operations are necessary in order to achieve a tripping characteristic, which approximates as closely as possible the intended one.

Known electronic leakage current devices have also drawbacks caused by non-optimum operating conditions. For example, a high operating temperature, caused by environmental factors or internal faults, can cause malfunctions of the device, which can compromise the safety of the user. The lack of monitoring of the voltage level of the power line also can lead to damage the device or the electric loads powered by the power line. The interruption of the neutral or ground conductors or the incorrect connection of the phase and neutral conductors of the power line can cause the electronic leakage current device to fail to operate. In this case, no protection is provided for the user even in conditions of normal use of the device if there is an earth fault in the power line.

Another drawback arises from the fact that known electronic leakage current devices are generally designed to use very specific types of actuator. In practice, the electronic circuits that generate the tripping signal are capable of driving only a certain type of actuator. If one decides to change actuator type, the entire electronic leakage current device must be redesigned in order to ensure satisfactory performance.

Another drawback arises from the fact that in known electronic leakage current devices, the design of the electronic circuits for generating the signal very often only marginally takes into account the operating condition of the sensor means, suitable to detect the presence of an electronic earth leakage current. In particular, technical solutions for monitoring, with diagnostics of the ON/OFF type, the operating condition of the sensor means are very often all that is provided. Since these sensor means have to interface with electronics designed for other specific purposes (the generation of a tripping signal if a certain earth leakage current level is exceeded), they often find themselves operating in a non-optimum manner, negatively affecting the performance of the entire device.

It is known that many electronic leakage current devices of the current art are provided with a remote control system. The existence of this kind of feature is, for example, highly appreciated when using electronic leakage current devices in the industrial field. Very often, however, known electronic leakage current devices comprise complex tripping systems which entail, for example, the need to provide a minimum-voltage coil installed next to the electronic leakage current device, or an additional system of windings in the current transformer used to detect the earth leakage current. Clearly, these facts entail considerable complications in the design of the electronic leakage current device, if one wishes to provide this kind of feature.

The aim of the present invention is to provide an electronic leakage current device for a low-voltage power line, which allows to control the tripping times of the device for each value of the detected electronic earth leakage current, avoiding unexpected interruptions of the power line.

Within the scope of this aim, an object of the present invention is to provide an electronic leakage current device, which allows to easily predefine the trend of the tripping characteristic of the device.

Another object of the present invention is to provide an electronic leakage current device, which allows to interrupt the power line if the operating condition of the electronic leakage current device is such that it cannot ensure an adequate level of protection for the user.

Another object of the present invention is to provide an electronic leakage current device, which allows to use different actuation devices without substantial modifications of the electronic circuits suitable to generate the tripping signal for said actuation devices.

Another object of the present invention is to provide an electronic leakage current device, which allows to optimize the operation of the sensors suitable for detecting the earth leakage current.

Another object of the present invention is to provide an electronic leakage current device, which allows to interrupt the power line if the sensors suitable to detect an earth leakage current malfunction.

Another object of the present invention is to provide an electronic leakage current device, which has a remote tripping control which is easy to design and use without the need for complicated tripping systems.

Another object of the present invention is to provide an electronic leakage current device, which is easy to manufacture and at relatively low costs.

Thus, the present invention provides an electronic leakage current device for a low-voltage power line, comprising:
  a moving contact and a fixed contact which can be mutually coupled/uncoupled;
  first sensor means for detecting an earth leakage current and for generating an electric signal which is indicative of the value of said earth leakage current;
  first electronic means which are electrically connected to said first sensor means in order to generate an electric tripping signal depending on an actuation means, operatively connected to said moving contact, in order to perform, in response to command electric signals, the separation of said moving contact from said fixed contact.

The electronic leakage current device, according to the present invention, is characterized in that said first electronic means comprise first circuit means for generating said electric tripping signal after a preset minimum time interval.

The electronic leakage current device, according to the present invention, ensures, by virtue of the presence of said first circuit means, the possibility to define a constant minimum time interval after which tripping is performed.

Interruption always occurs after a constant minimum time interval, after which it is highly probable that an earth leakage current is present. In this manner, unwanted interruptions of the power line are avoided and the selectivity of the electronic leakage current devices is improved, considerably improving the general performance of the power line in which they are inserted. Since the minimum tripping time can be easily preset during design, coordination of the tripping events of several electronic leakage current devices, inserted in an electric network, is considerably facilitated.

Further characteristics and advantages of the invention will become apparent from the detailed description of a preferred embodiment of the electronic leakage current device according to the present invention, illustrated only by way of non-limitative example in the accompanying drawings, wherein:

FIG. 1 plots the tripping characteristic related to a few known types of electronic leakage current device;

Figure 2:
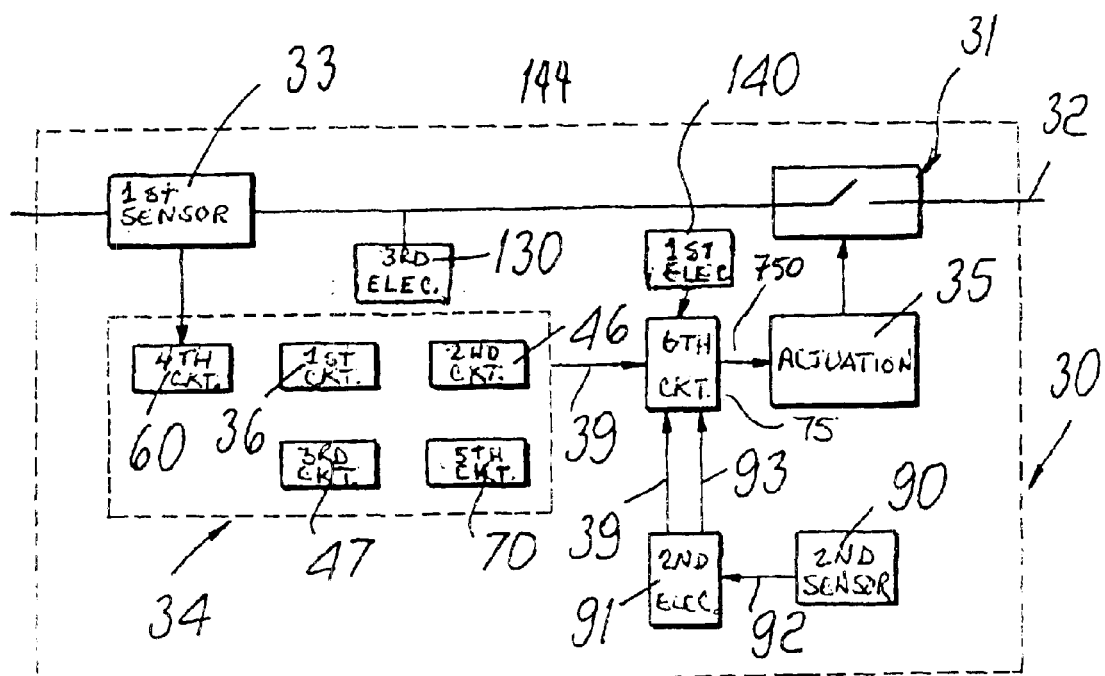
FIG. 2 is a block diagram of an electronic earth leakage current device according to the invention.

The structure of an electronic leakage current device according to the invention is shown schematically with reference to FIG. 2.

The device according to the invention (which is delimited by the dashed line 30) comprises a moving contact and a fixed contact, which can be mutually coupled/uncoupled (reference 31). The separation of the moving contact from the corresponding fixed contact obviously produces the interruption of the power line 32.

The power line 32 can be of the single-phase or three-phase type, according to the requirements of the electric user. The electronic leakage current device 30 comprises first sensor means 33 for detecting an earth leakage current in a phase conductor of the power line 32. The sensor means 33 therefore generate an electric signal, which is indicative of the value of the detected earth leakage current.

According to a preferred embodiment, the first sensor means 33 comprise at least one current transformer provided with a primary winding, which comprises a phase conductor of the power line 32. In the case of a three-phase power line, the primary winding of the current transformer can comprise multiple phase conductors or even the neutral conductor of the power line 32. An electric current signal flows in the secondary winding of the transformer in response to the presence of an earth leakage current in the phase conductor (which constitutes the primary winding). This electric current signal is therefore indicative of the value of the earth leakage current.

The electronic leakage current device 30 comprises first electronic means 34, which are electrically connected to the sensor means 33. The first electronic means 34 generate an electric tripping signal 39, depending on the electric signal, which is indicative of the value of the earth leakage current (such as for example the one sent by the sensor means 33). The electronic leakage current device 30 furthermore comprises actuation means 35, which are operatively connected to the moving contact of the pair of electric contacts 31. The actuation means 35 produce, in response to command electric signal 750, the separation of the moving contact from the corresponding fixed contact and therefore produce the interruption of the power line 32.

As already described, the electronic leakage current 30 is characterized in that said first electronic means 34 comprise first circuit means 36 for generating an electric tripping signal after a preset constant minimum tripping time.

Figure 3:
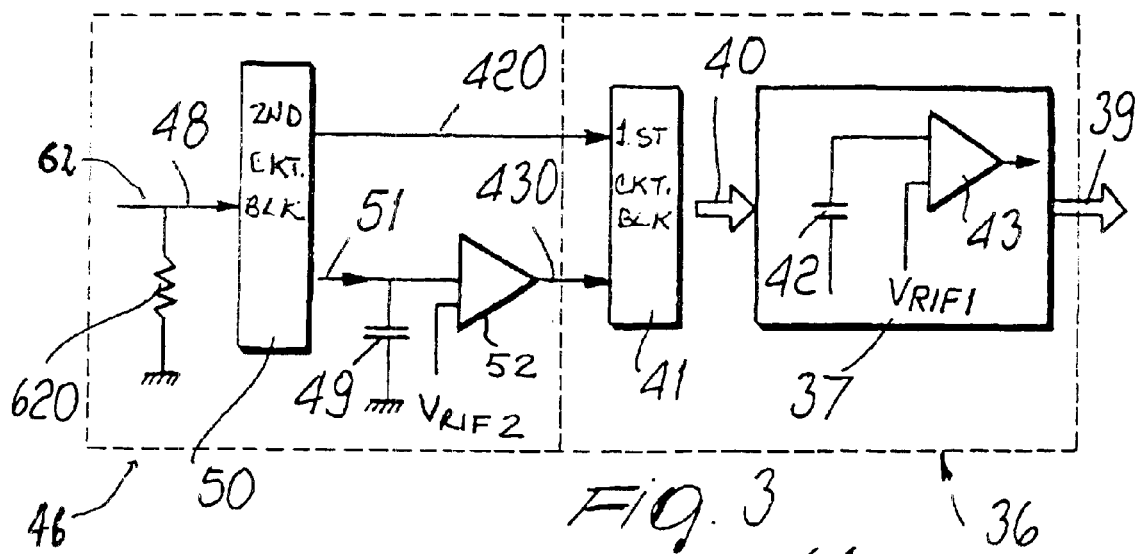
FIG. 3 is a block diagram of first and second circuit means of the electronic earth leakage current device according to the invention.

Advantageously (FIG. 3), the first circuit means 36 comprise a first circuit network 37 for generating an electric tripping signal 39, following the reception in input of an electric current signal 40 and a first circuit block 41 for generating the electric current signal 40 following the reception of first and second enable signals (references 420 and 430). The circuit block 41 is also meant to perform, following the failed reception of the enable signals 420 and 430, a pre-discharge of said first circuit network. This can occur by sending in input to the circuit network 37 a current signal 40 having the appropriate polarity.

In a preferred embodiment, the circuit network 37 preferably comprises a first capacitive element 42, which is connected to earth. The capacitive element 42 is charged/discharged by the electric current signal 40 sent by the first circuit block 41. The circuit network 37 can furthermore comprise a first comparator element 43, which is electrically connected to the capacitive element 42. The comparator element 43 receives in input the charging voltage across the capacitive element 42 and generates an electric tripping signal 39, if said charging voltage exceeds a preset reference voltage ($V_{RIF1}$).

In a preferred embodiment, the electronic leakage current device 30 comprises (FIGS. 2 and 3) second circuit means 46 for defining a minimum value of the earth leakage current, beyond which an electric tripping signal is to be generated. Further, the electronic leakage current device 30 may comprise third circuit means 47 for generating a tripping signal within a maximum time interval, calculated according to a substantial relation of inverse proportionality with respect to an earth leakage current value higher than this minimum value.

Advantageously, the second circuit means 46 comprise a resistive calibration element 620 for generating (FIG. 4), by virtue of the reception of an electric current signal 62, a first reference voltage 48 proportional to said minimum value of the earth leakage current. The second circuit means advantageously comprise a second capacitive element 49 connected to earth and a second circuit block 50. The circuit block 50 is meant to send an electric current signal 51 to the capacitive element 49, depending on the first reference voltage 48, so as to generate a charging voltage across the capacitive element 49, if an earth leakage current above said minimum value is present. If this does not occur, the signal 51 is sent so as to discharge the capacitive element 49.

Advantageously, the circuit block 50 provides, depending on the first reference voltage 48, a first logic signal, which is used as enable signal 420. The second circuit means 46 can furthermore comprise a second comparator element 52, which is coupled to the capacitive element 49. The comparator element 52 receives in input the charging voltage across the capacitive element 49 and generates a second logic signal, which is used as enable signal 430, if said charging voltage exceeds a preset reference voltage ($V_{RIF2}$).

Again with reference to FIG. 3, the operation of the first, second and third circuit means comprised in the device 30 is described in greater detail.

The calibration resistor 620 generates a reference voltage, depending on which the circuit block charges the capacitive element 49. In particular, if the reference voltage indicates the presence of a value of the earth leakage current higher than the minimum value, the block 50 starts the charging process so that the charging time is inversely proportional to the detected earth leakage current. Once charging has been completed (enable signal 430), and if a sufficiently high earth leakage current is still present (enable signal 420), the block 41 charges the capacitive element 42. In order to ensure a constant charging time, charging occurs in a linear manner, which is not proportional to the detected earth leakage current. In this manner, a constant minimum time interval, after which the electric tripping signal 39 is generated, is set. The described constructive solutions are particularly advantageous, since they allow predefining during design the entire tripping characteristic of the electronic leakage current device.

Figure 1:
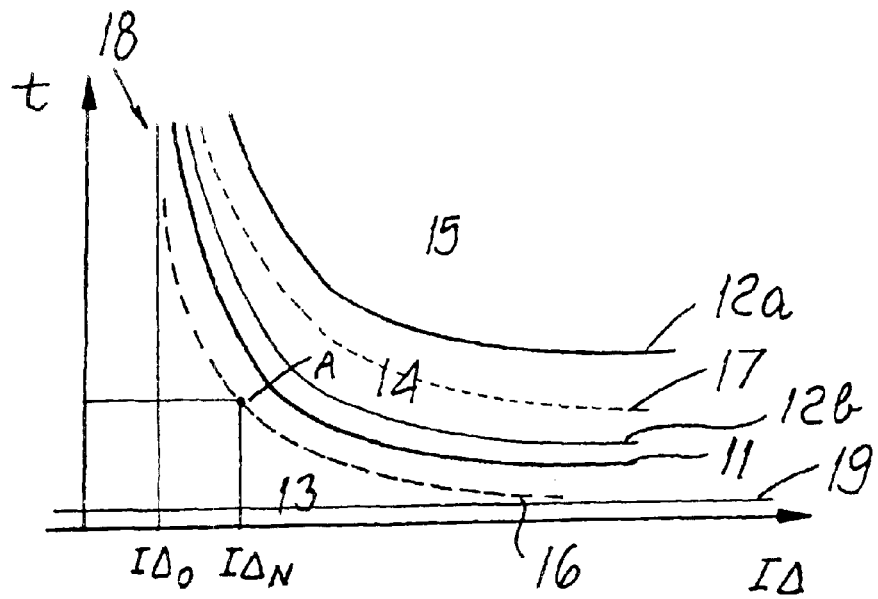

The maximum time interval for tripping is in fact defined by the sum of the charging times of the capacitive elements 49 and 42. In this manner, owing to the way in which the capacitive element 49 is charged, it is substantially inversely proportional to the detected earth leakage current. With reference to FIG. 1, this is equivalent to defining the trend of the tripping characteristic in the neighborhood of the nominal earth leakage current. On the other hand, for earth leakage current values that are relatively higher than the nominal value, the charging time of the capacitive element 49 becomes negligible, while the charging time of the capacitive element 42 remains constant. Accordingly, a constant minimum tripping time is set, and this is equivalent to defining the horizontal asymptote 19 of FIG. 1. Finally, the calibration resistor allows determining, by generating the reference voltage 48, the vertical asymptote 18 of FIG. 1. The tripping characteristic of the device 30 can therefore be fully defined during design. It is therefore possible to decide "in advance" the tripping characteristics of the electronic leakage current device, allowing to better meet the requirements of the electrical user.

It is also very important that predischarge of the capacitive elements 49 and 42 is performed if the conditions for generating an electric tripping signal do not occur, according to the described criteria.

This, in fact, allows to avoid unwanted trippings (untimely trippings) caused by accumulations of charge in the capacitive elements 49 and 42. The presence of accumulated charge would in fact reduce the charging times of the capacitive elements 42 and 49 and therefore it would no longer be possible to ensure a preset minimum time interval after which tripping is to occur.

Figure 4:
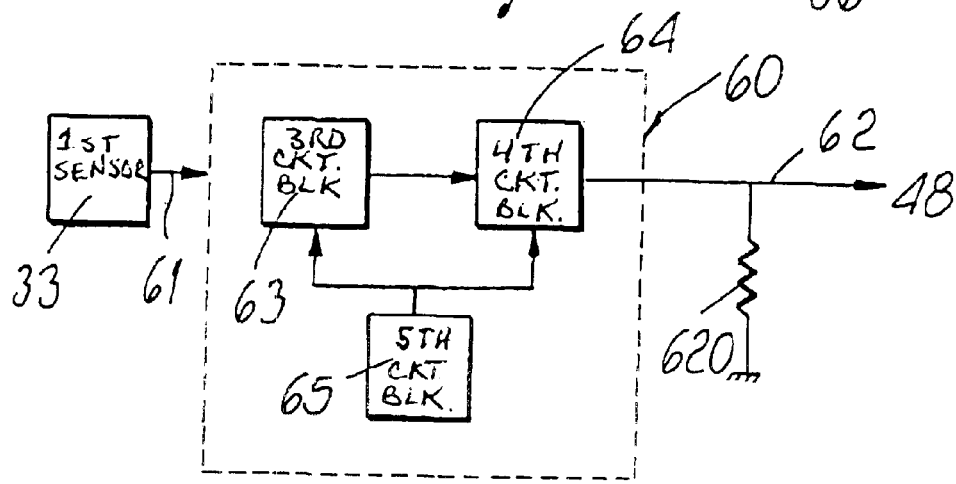
FIG. 4 is a block diagram of fourth circuit means of the electronic earth leakage current device according to the invention.

In another embodiment, the first electronic means 34 comprise (FIG. 2) fourth circuit means 60 for interfacing with the first sensor means 33. With reference to FIG. 4, the fourth circuit means 60 receive, from said first sensor means 33, an electric signal 61, which is indicative of the value of the earth leakage current and generate an electric current signal 62, indicative of the absolute value of the earth leakage current. The current signal 62 is preferably sent to the resistor 620 in order to generate the reference voltage 48. Advantageously, the circuit means 60 comprise (FIG. 4) a third low-impedance circuit block 63, which is electrically connected to the first sensor means 33, so as to ensure their linear operation. A fourth circuit block 64 is furthermore comprised and is electrically connected to the circuit block 63 in order to receive said electric signal, which is indicative of the value of the earth leakage current and in order to generate an electric current signal, which is indicative of the absolute value of the detected earth leakage current. Advantageously, a fifth filtering circuit block 65 is comprised, which is provided with means for eliminating high-intensity noise (protection diodes) and/or high-frequency noise (an RC network). This embodiment is particularly advantageous, since it allows to optimize the performance of the sensor means 33 especially if, as commonly occurs in practice, they comprise a current transformer. In this case, the secondary winding of the current transformer can operate in substantially ideal conditions (i.e. close to the short-circuit condition).

Figure 5:
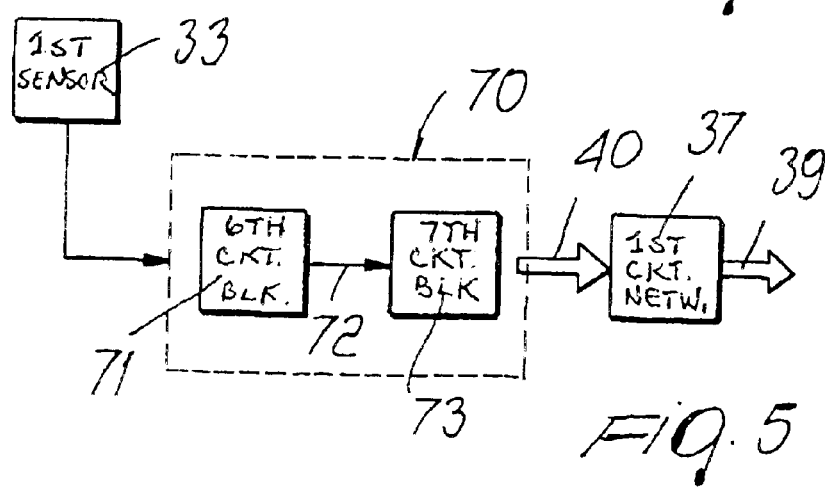
FIG. 5 is a block diagram of fifth circuit means of the electronic earth leakage current device according to the invention.

In another preferred embodiment, the first electronic means 34 comprise fifth circuit means 70 for generating an electric tripping signal 39, if said first sensor means 33 malfunction. With reference to FIG. 5, the circuit means 70 advantageously comprise a sixth circuit block 71 for measuring predefined physical parameters which are indicative of the operating condition of said first sensor means. For example, if the sensor means comprise a current transformer, it is possible to measure the equivalent resistance of the secondary winding of the transformer. If the values of said physical parameters are not comprised within a preset range, the circuit block 71 generates a third enable signal 72 for a seventh circuit block 73, which is electrically connected to the first circuit network 37. The circuit block 73 generates, following reception of the enable signal 72, an electric current signal 40 to be sent in input to the first circuit network 37, so as to generate an electric tripping signal 39.

This constructive embodiment is particularly advantageous, since it allows to avoid the possibility of failure of the electronic leakage current device 30 to operate, for example due to possible damage suffered during the assembly of the sensor means 33.

Again with reference to FIG. 2, the actuation means are advantageously connected to sixth circuit means 75 which are suitable to receive an electric tripping signal (39 and/or 93 and/or 144) and to generate one or more command electric signals 750 for activating said actuation means. The sixth circuit means 75 preferably comprise an eighth circuit block (not shown), provided with an output stage of the latch type, which has two stable operating states.

The sixth circuit means can furthermore comprise one or more electronic circuits (for example properly configured transistor stages) for generating one or more electric signals having a relatively high output current value. In this manner, it is possible to drive actuation means of a different type without substantially modifying the first electronic means 36.

In a particularly advantageous embodiment (FIG. 2), the electronic leakage current device 30, according to the invention, comprises second sensor means 90 for detecting one or more physical values which are indicative of the operating condition of the device 30. The sensor means 90 are electrically connected to second electronic means 91, which are suitable to receive from the sensor means 90 electric signals 92, which are indicative of the operating condition of the electronic leakage current device. The electronic means 91 generate, on the basis of the electric signals 92, an electric tripping signal 93 and/or an electric tripping signal 39.

The second sensor means 90 can advantageously comprise at least one sensor, arranged inside and/or outside the device 30, for detecting its operating temperature. The temperature sensor generates an electric signal, which is indicative of the measured temperature and is to be sent to the second electronic means. In this manner, the power line is interrupted as soon as the operating temperature of the device exceeds a preset value. In this manner, the user can intervene safely before a malfunction of the device 30 occurs. For example, the temperature detection sensor can be constituted by a transistor configured according to the techniques known in the art.

Likewise, the second sensor means 90 can also include at least one sensor for detecting the voltage of a phase of the power line, generating an electric signal, which is indicative of the value of said detected voltage, to be sent to the electronic means 91. In this case also, the device 30 trips before the voltage of the power line exceeds a preset value. In this manner, both any loads connected to the line and the electronic leakage current device itself are protected against the excessive line voltage. For example, the voltage detection sensor can be constituted by a voltage divider, which is connected to the power line.

Moreover, the second sensor means 90 can comprise sensors for detecting the electrical continuity condition of the neutral or earth conductors of said power line and for detecting the correct connection condition of the neutral and/or phase conductors. In any case, an electric signal indicative of said operating condition of the device, to be sent to the electronic means 91 is generated. In this case, the sensors to be used can comprise a circuit network, which comprises resistive elements which are coupled to diodes arranged so as to produce an appropriate voltage signal, if the neutral or earth conductor is interrupted or if there is an incorrect connection of the phase and neutral conductors.

Figure 6:
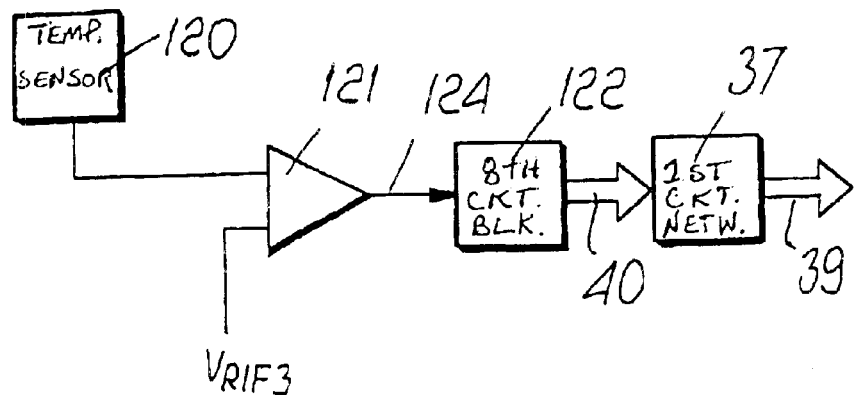
FIG. 6 is a block diagram of second electronic means of the electronic earth leakage current device according to the invention.

With reference to FIG. 6, in order to generate a tripping signal, the electronic means 91 can comprise, if they are connected to a temperature sensor 120, a comparator element 121, suitable to generate an enable signal 124 if the electric signal that arrives from the sensor 120 exceeds a preset reference voltage $V_{RIF3}$.

The enable signal 124 is sent in input to an eighth circuit block 122 which generates a current signal 40 which is suitable to be sent in input to the circuit network 37 that generates the tripping signal 39.

In a similar manner, which can be easily provided according to commonly used electronic design techniques, the signals that arrive from the described sensor elements can be processed by one or more circuit blocks in order to generate a tripping signal for activating the actuation means.

Advantageously, the electronic leakage current device 30, according to the invention comprises third electronic means 130, which are electrically connected to the power line 32 in order to provide a supply voltage to the first and/or second electronic means 34 and 91.

Figure 7:
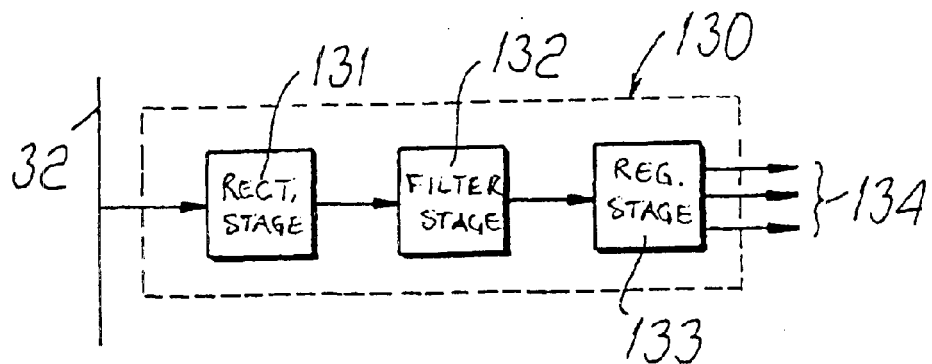
FIG. 7 is a block diagram of third electronic means of the electronic earth leakage current device according to the invention.

With reference to FIG. 7, the third electronic means 130 can comprise a rectifier stage 131 (for example a diode bridge), which is connected to a filtering stage 132 (for example an RC network) which is in turn connected to a regulator stage 133, suitable to provide the various voltage levels (reference 134) used to supply the various components or for the voltage references (such as for example the reference voltages $V_{RIF1}$, $V_{RIF2}$ and $V_{RIF3}$).

Figure 8:
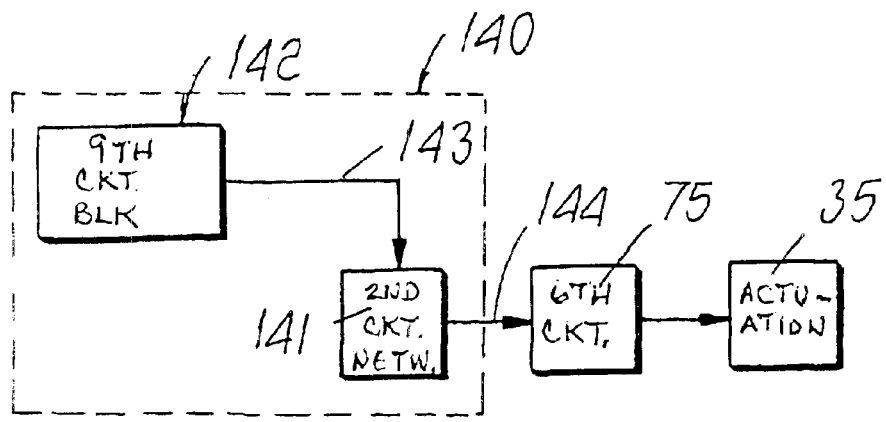
FIG. 8 is a block diagram of fourth electronic means of the electronic earth leakage current device according to the invention.

In a particularly advantageous embodiment, the device 30 comprises fourth electronic means 140 FIG. 8) which are electrically connected to the circuit means 75 in order to remotely generate command signals 750 to activate the actuation means 35.

The electronic means 140 can comprise, for example, a circuit 142 which is connected to a circuit network 141 which is suitable to generate a tripping signal 144 following the reception in input of an electric signal 143.

The circuit 142 can comprise, for example, a normally-open switch which is connected to a supply voltage $V_0$ and to a resistive network $R_1$. When the switch closes, an electric voltage signal is generated which, in input to the network 141, produces the generation of the tripping signal 144.

In practice it has been found that the electronic leakage current device, according to the invention, fully achieves the intended aim and objects.

Furthermore, it has been found that the electronic leakage current device according to the invention is easy to manufacture at low cost. In particular, the first and/or second and/or third electronic means can be integrated at least partially in a microelectronic semiconductor circuit, particularly in an ASIC (Application-Specific Integrated Circuit) or in a microcontroller.

This allows to considerably reducing room occupation, while reducing manufacturing costs and improving operating reliability.

What is claimed is:

1. An electronic earth current leakage current device for a low-voltage power line, comprising:
   a moving contact and a fixed contact which can be mutually coupled/uncoupled; and
   first sensor means for detecting an earth leakage current and for generating an electric signal which is indicative of the value of said earth leakage current; and
   first electronic means which are electrically connected to said first sensor means in order to generate an electric tripping signal depending on said electric signal which is indicative of the value of said earth leakage current; and
   actuation means, operatively connected to said moving contact, in order to perform, in response to command electric signals, the separation of said moving contact from said fixed contact;
   wherein said first electronic means comprise first circuit means for generating said electric tripping signal after a preset constant minimum time interval, and
   said first circuit means comprise a first circuit network for generating an electric tripping signal, following the reception in input of an electric signal; and a first circuit block for sending, following the reception of a first and second enable signals in input to said first circuit network, an electric current signal for generating said electric tripping signal after the preset constant minimum time interval.

2. An electronic earth current leakage device, according to claim 1, characterized in that said first circuit block, following failure to receive said first and second enable signals, sends, in input to said first circuit network, an electric current signal for performing a pre-discharge of said first circuit network.

3. An electronic earth current leakage device, according to claim 1, characterized in that said first circuit network comprises:
   a first capacitive element, which is connected to the earth and is charged/discharged by an electric current signal sent by said first circuit block; and
   a first comparator element, which is electrically connected to said first capacitive element, said comparator element receiving in input the charging voltage across said first capacitive element and generating an electric tripping signal, if said charging voltage exceeds a preset reference voltage.

4. An electronic earth current leakage device, according to claim 1, wherein said first electronic means comprise:
   second circuit means comprising a resistive calibration element for generating, by virtue of the reception of an electric current signal, a first reference voltage which is proportional to a defined minimum value of the earth leakage current.

5. An electronic earth current leakage device, according to claim 4, wherein said second circuit means comprise:
   a second capacitive element, which is connected to earth; and
   a second circuit block for:
   sending an electric current signal to said second capacitive element, depending on said first reference voltage, so as to generate a charging voltage across said second capacitive element, if a earth leakage current value higher than said minimum value is present, and discharge said second capacitive element, if a earth leakage current higher than said minimum value is not present; and
   providing a first logic signal depending on said first reference voltage; and
   a second comparator element, which is coupled to said second capacitive element, said second comparator element receiving in input the charging voltage across said second capacitive element and generating a second logic signal if said charging voltage exceeds a preset reference voltage.

6. An electronic earth current leakage device, according to claim 1, characterized in that said first and second logic signals are used respectively as first and second enable signals for said first circuit block.

7. An electronic earth current leakage device, according to claim 1, characterized in that said first electronic means comprise fourth circuit means for interfacing with said first sensor means, said fourth circuit means receiving from said first sensor means an electric signal which is indicative of the value of the earth leakage current and generating an electric current signal which is indicative of the absolute value of said earth leakage current.

8. An electronic earth current leakage device, according to claim 1, characterized in that said first electronic means comprise fifth circuit means for generating an electric tripping signal if said first sensor means malfunction.

9. An electronic earth current leakage device, according to claim 1, characterized in that it comprises:

second sensor means for detecting one or more physical values which are indicative of the operating condition of said electronic leakage current device; and second electronic means which are electrically connected to said second sensor means in order to receive from said second sensor means electric signals which are indicative of the operating condition of said electronic leakage current device and generate, depending on said electric signals, an electric tripping signal.

10. An electronic earth current leakage device, according to claim 9, characterized in that it comprises third electronic means which are electrically connected to said low-voltage power line, in order to provide a power supply voltage to said first and/or second electronic means.

11. An electronic earth current leakage device, according to claim 10, characterized in that it comprises fourth electronic means, electrically connected to said actuation means, for remotely generating a tripping command.

12. An electronic earth current leakage device, according to claim 11, characterized in that said actuation means are electrically connected to sixth circuit means, which are suitable to receive an electric tripping signal from said first and/or second and/or fourth electronic means and to generate one or more command electric signals for activating said actuation means.

13. An electronic earth current leakage device, according to claim 10, characterized in that said first and/or second and/or third electronic means are at least partially integrated in one or more microelectronic semiconductor circuits.

14. An electronic earth current leakage device, according to claim 1, characterized in that said first circuit network comprises:

a first capacitive element, which is connected to the earth and is charged/discharged by an electric current signal sent by said first circuit block; and a first comparator element, which is electrically connected to said first capacitive element, said comparator element receiving in input the charging voltage across said first capacitive element and generating an electric tripping signal, if said charging voltage exceeds a preset reference voltage.

15. An electronic earth current leakage device, according to claim 2, characterized in that said first circuit network comprises:

a first capacitive element, which is connected to the earth and is charged/discharged by an electric current signal sent by said first circuit block; and a first comparator element, which is electrically connected to said first capacitive element, said comparator element receiving in input the charging voltage across said first capacitive element and generating an electric tripping signal, if said charging voltage exceeds a preset reference voltage.

16. An electronic earth current leakage device, according to claim 1, characterized in that said first electronic means comprise:

second circuit means for defining a minimum value of said earth leakage current, an electric tripping signal being generated for earth leakage current values higher than said minimum value; and/or third circuit means for generating a tripping signal within a maximum time interval, calculated according to a substantial relation of inverse proportionality with respect to a earth leakage current, which is higher than said minimum value.

17. An electronic earth current leakage device, according to claim 2, characterized in that said first electronic means comprise:

second circuit means for defining a minimum value of said earth leakage current, an electric tripping signal being generated for earth leakage current values higher than said minimum value; and/or third circuit means for generating a tripping signal within a maximum time interval, calculated according to a substantial relation of inverse proportionality with respect to a earth leakage current, which is higher than said minimum value.

18. An electronic earth current leakage device, according to claim 3, characterized in that said first electronic means comprise:

second circuit means for defining a minimum value of said earth leakage current, an electric tripping signal being generated for earth leakage current values higher than said minimum value; and/or third circuit means for generating a tripping signal within a maximum time interval, calculated according to a substantial relation of inverse proportionality with respect to a earth leakage current, which is higher than said minimum value.

* * * * *